United States Patent [19]

Mori

[11] Patent Number: 4,616,269
[45] Date of Patent: Oct. 7, 1986

[54] DOCUMENT READER

[75] Inventor: Ikuo Mori, Ebina, Japan

[73] Assignee: Fuji Xerox Co., Ltd., Japan

[21] Appl. No.: 779,037

[22] Filed: Sep. 23, 1985

[30] Foreign Application Priority Data

Oct. 17, 1984 [JP] Japan ............................. 59-216428

[51] Int. Cl.⁴ ............................................. H04N 1/10
[52] U.S. Cl. .................................. 358/293; 358/280; 355/7; 382/45; 382/48
[58] Field of Search ............... 358/256, 280, 287, 293; 355/7; 382/45, 48

[56] References Cited

U.S. PATENT DOCUMENTS 4,303,948 12/1981 Arai et al. ............................ 358/287
4,468,755 8/1984 Iida ...................................... 358/287
4,520,399 8/1985 Iida ...................................... 358/287
4,538,183 8/1985 Kahno et al. ....................... 358/280

Primary Examiner—James J. Groody
Assistant Examiner—Edward L. Coles
Attorney, Agent, or Firm—Kinney & Lange

[57] ABSTRACT

A document reader contains a document display window for focussing the light reflected from the surface of a given manuscript thereon, a scale formed on the document display window and provided with a cursor capable of being moved in the direction of main scanning, means for freely controlling the shift of a reading line on the manuscript in the direction of sub-scanning, and means for automatically sensing the position of the cursor and the position of the reading line on the manuscript and admitting the numerical values indicative of the two positions for designating the pertinent region of the manuscript to be read out, whereby the operator is enabled to set the pertinent region of the face of the manuscript very easily and accurately while keeping visual observation of the image displayed in the document display window, with the manuscript left standing on the platen glass or kept inserted in the manuscript slot of the document reader.

11 Claims, 10 Drawing Figures

DOCUMENT READER

BACKGROUND OF THE INVENTION

1. Field of the Invention

This invention relates to a document reader, and more particularly to a document reader which, when any region of a given manuscript is desired to be exclusively read out or copied, enables designation of the aforementioned region for reading or copying to be easily effected while the manuscript is left standing on a platen glass or kept inserted in a manuscript slot of the document reader.

2. Description of the Prior Art

The conventional electrophotographic copying machine is based on the principle that a copy of a given manuscript is obtained by illuminating the manuscript with a light from a light source and causing the light reflected on the surface of the manuscript to impinge directly on the surface of a photosensitive body thereby generating an electrostatic latent image on the photosensitive body.

In accordance with this method, the process for formation of the electrostatic latent image on the photosensitive body is wholly carried out under mechanical control. When the ratio of magnification used in copying the manuscript in an enlarged or reduced size is to be set at any desired value, therefore, mechanisms such as for adjustment of the lens position and for control of scanner speed greatly gain in complexity so much as to boost the cost of production of the electrophotographic copying machine. Besides, the desire to copy the manuscript exactly at a desired ratio of magnification proves difficult.

In consequence of the advance of various office automation machines, the conventional process of reading a given manuscript in a predetermined paper size such as A3 or A4 and producing the output on recording papers is no longer able to meet all the needs of the day. There have arisen needs which make it necessary to have only a pertinent region of a given manuscript exclusively read out and copied, or even to have only the pertinent region of the manuscript copied as enlarged or reduced at a desired ratio of magnification and/or rotated at a desired angle in a desired position on a recording paper (hereinafter the processing described above will be collectively referred to as "editing").

By the aforementioned method for formation of an electrostatic latent image under mechanical control, however, it is totally infeasible to confer the aforementioned editing function upon the electrophotographic copying machine.

In the circumstance, efforts are being devoted to the development of an electrophotographic copying machine which produces a copy of a given manuscript by illuminating the manuscript with a light from a light source, causing the light reflected on the surface of the manuscript to be read and converted into digital signals by a photoelectric element such as CCD, subjecting the digital signals to a proper processing, and thereafter forming an electrostatic latent image on the surface of a photosensitive body by the use of a light emitting element such as LED (hereinafter referred to as a digital copying machine).

One version of the aforementioned digital copying machine is disclosed in the specification of Japanese Patent Laid-open SHO No. 59(1984)-63,868. This specific digital copying machine is depicted in the specification as comprising a document reading device (reader) and a digital document reproducing device (printer).

When only a pertinent region of a given manuscript is to be read out by the document reading device disclosed in the aforementioned specification, the following operation must be carried out.

The operator, before placing the manuscript on a platen glass, is required to cover the manuscript with a transparent sheet having checkers printed thereon for reading coordinates in such a manner that the reference line on the manuscript will coincide with that on the checkers, read the coordinates of the pertinent region of the manuscript (or the masking region of the manuscript), and then feed in the numerical values of the coordinates through a ten-key arranged on the operation panel for the document reading device.

FIG. 2 is a schematic diagram for illustrating the correspondence between the face of the manuscript and the regions on the document recording memory. FIG. 2(a) represents the face of the manuscript and FIG. 2(b) the document recording memory.

When only a region indicated by hatch lines in the entire face of the manuscript shown in FIG. 2(a) is desired to be read or to be masked, the transparent sheet having checkers printed thereon is placed as described above to cover the manuscript.

Then, the distances $x_O$ and $x_O + \Delta x$ in the direction of main scanning (the direction indicated by the arrow x) from the reference line $L_y$ and the distances $y_O$ and $y_O + \Delta y$ in the direction of sub-scanning (the direction indicated by the arrow y) from the reference line Lx are read out. The numerical values of these distances are fed in through the ten-key.

Between the numerical values fed in through the ten-key as described above and a region of the document data memory (defined by the coordinates of the directions indicated by the arrows X and Y) illustrated in FIG. 2 (b), the following known functional relations exist, for example.

$f(x) = X$ $f(y) = Y$

The region indicated by hatch lines in FIG. 2(b), therefore, can be set on the document data memory by allowing the numerical values, $x_O$, $x_O + \Delta x$, $y_O$, and $y_O + \Delta y$, fed in by the operation of the ten-key to be processed as by a micro-computer. In other words, the numerical values of $X_O$, $X_O + \Delta X$, $Y_O$, and $Y_O + \Delta Y$ can be set and, as the result, only the pertinent region of the manuscript can be read out.

In FIG. 2, the pertinent region of the manuscript desired to be read out is depicted as a rectangle having four sides parallel to the direction of main scanning or sub-scanning. Optionally, the pertinent region may be a polygon so long as all the sides of the polygon run parallelly to the direction of main scanning or the direction of sub-scanning.

In the foregoing description, the document data are presumed to be tentatively stored in the memory. Instead of elaborately assigning the memory to the tentative storage of the data, the signals representing the information in the pertinent region of the face of the manuscript can be fed out on the real-time basis (optionally after being subjected to a proper processing).

In accordance with the conventional method described above, when only a pertinent portion of a given manuscript is desired to be read out, the operator is required, before placing the manuscript on a platen glass, to cover the manuscript with a transparent sheet having checkers printed thereon for reading coordinates, read out the numerical values of the coordinates of the pertinent region of the manuscript with reference to the checkers on the transparent sheet, and feed in the numerical values through the ten-key arranged on the operation panel for the document reading device as already described above. Thus, the conventional method has entailed the following disadvantages.

(1) If the numerical values of the coordinates of the pertinent region of the manuscript are read out erroneously or they are fed in erroneously through the ten-key, the portion of the manuscript actually read out or the copy of the manuscript formed on the recording paper may deviate from the region desired to be copied. Thus, the produced copy is found to be rejected.

(2) Even if the numerical values of the coordinates of the pertinent region of the manuscript are correctly read out and then are fed in correctly through the ten-key, there is still the possibility that a reference line of the manuscript will deviate from a reference line of the checkers printed on the transparent sheet or the manuscript will not be correctly placed at the prescribed position on the platen glass. This incorrect location of the manuscript results in production of a rejectable copy.

(3) When a pertinent region is selected in the manuscript, the manuscript is placed so that the face of the manuscript will fall on the upper side. When the manuscript is exposed to light for copying, the manuscript is placed on the platen glass in such a manner that the face of the manuscript will fall on the lower side. Thus, the handling of the manuscript during the copying work takes up twice as much time and labor as the handling involved in the case of the ordinary electrophotographic copying machine. The operator tending the document reading deivce, therefore, is burdened with a highly troublesome job.

(4) The setting of the pertinent region of the manuscript has no alternative but to rely on the procedure of actually measuring the pertinent region and subsequently feeding in the numerical outcomes of the measurement through the ten-key. This particular procedure proves to be a toublesome job for the operator.

BRIEF SUMMARY OF THE INVENTION

An object of this invention, therefore, is to provide a document reader which is incapable of generating any positional deviation in the copy produced on a recording paper.

Another object of this invention is to provide a document reader which enables the setting of a pertinent region of a given manuscript to be effected without requiring the region to be actually measured or the numerical data defining the region to be fed in through the ten-key.

Yet another object of this invention is to provide a document reader which enables the setting of a pertinent region on a given manuscript to be effected without necessitating reference to checkers or requiring the manuscript to be turned upside down on a platen glass.

To accomplish the objects described above, this invention furnishes a document reader with a document display window for focussing the light reflected from the surface of a given manuscript thereon, a scale formed on the document display window and provided with a cursor capable of being moved in the direction of main scanning, means for freely controlling the shift of a reading line on the manuscript in the direction of the sub-scanning, and means for automatically sensing the position of the cursor and the position of the reading line on the manuscript and admitting the numerical values indicative of the two positions for designating the pertinent region of the manuscript to be read out, whereby the operator is enabled to set the pertinent region of the face of the manuscript very easily and accurately while keeping visual observation of the image displayed in the document display window, with the manuscript left standing on the platen glass or kept inserted in the manuscript slot of the document reader.

DETAILED DESCRIPTION OF THE PREFERRED EMBODIMENTS

This invention can be applied to the fixed platen type, moving platen type, or manuscript feeding type document reader.

Now, the present invention will be described in detail below with reference to the accompanying drawings.

Figure 1:
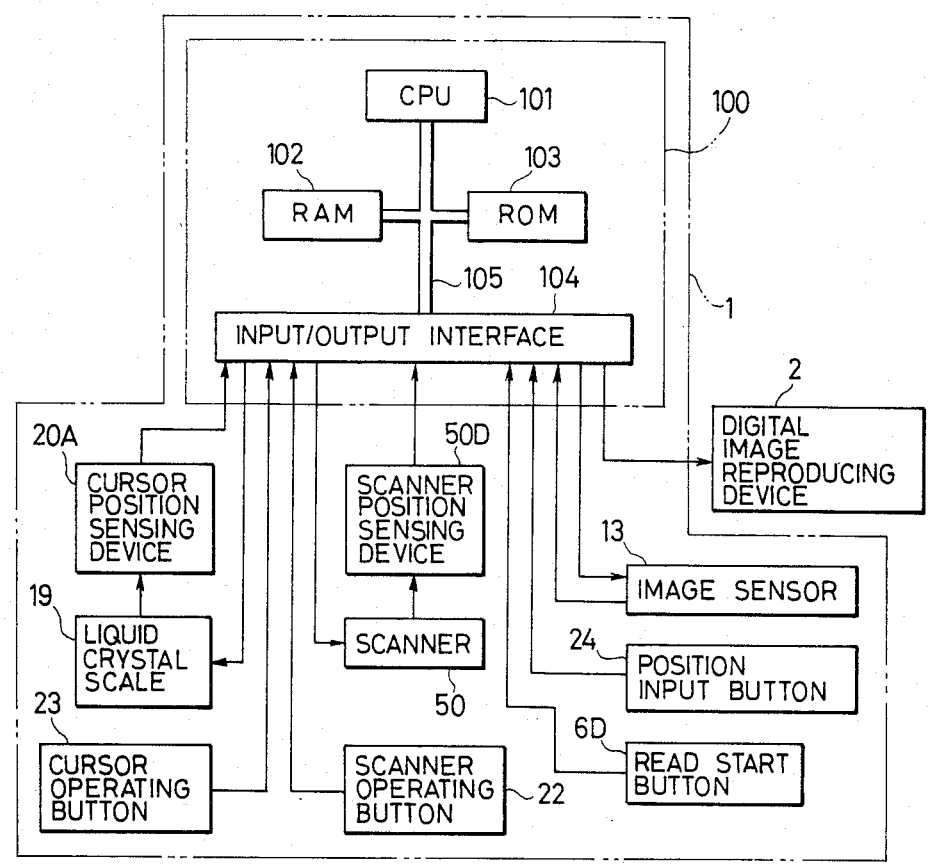
FIG. 1 is a schematic block diagram of an embodiment of the present invention.

FIG. 1 is a schematic block diagram of an embodiment of this invention.

As illustrated in the diagram, a digital copying machine comprises a document reading device 1 and a digital image reproducing device 2. This document reading device 1 is assumed to be of the fixed platen type.

A microcomputer 100, as widely known, is composed of CPU 101, RAM 102, ROM 103, and an input/output interface 104. The aforementioned CPU 101, RAM 102, ROM 103, and input/output interface 104 are interconnected with a common bus 105.

The aforementioned RAM 102 serves to store the image data read out by an image sensor 13 and/or a pertinent region of a manuscript desired to be read out or masked as described afterward. Thus, it possesses the same function as the memory illustrated in FIG. 2(b).

Figure 3:
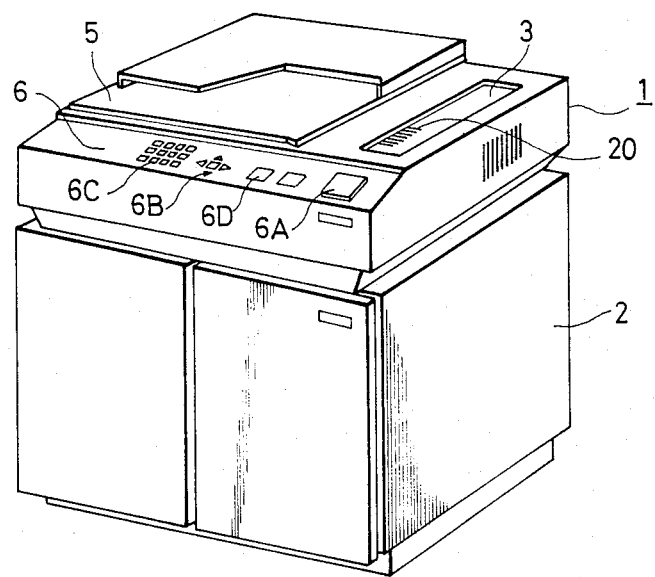
FIG. 3 is a schematic perspective view of a digital copying machine utilizing an embodiment of the present invention.
Figure 4:
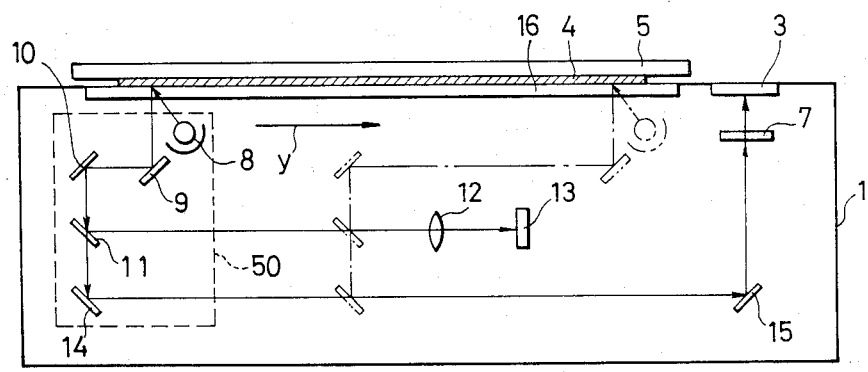
FIG. 4 is a schematic cross section for illustrating an optical system in the document reader suitable for the present invention.

The casing of the document reading device 1 is provided with a document display window 3 as described afterward with reference to FIG. 3 and FIG. 4. As described afterward with reference to FIG. 4 or to FIG. 7 through FIG. 9, a part of light reflected on the manuscript reaches the document display window 3.

In the document display window 3, a liquid crystal scale 19 of the bar graph type is formed. The number of bars 20 (FIG. 5) or the height of the column of bars displayed in the liquid crystal scale 19 can be increased or decreased, by a cursor operating button 23 connected to the input/output interface, in the direction parallel to the direction of main scanning in the manuscript display window 3. Optionally, only the top of the column of bars may be shifted instead of changing the number of bars 20.

Figure 2A:
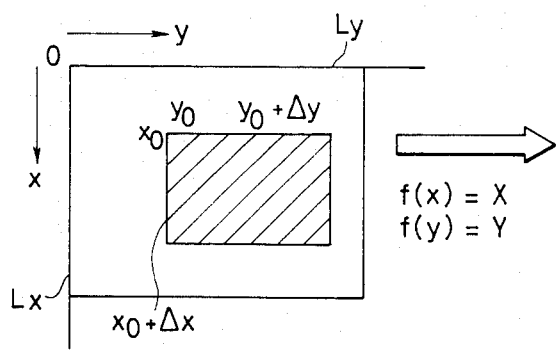
FIGS. 2 $a+b$ are schematic diagrams illustrating the correspondence between the face of a manuscript or a platen glass and the region of a document recording memory.

FIG. 2(a) has been described as representing the face of a manuscript. In the following description, it will be assumed as representing the face of a platen glass or the maximum document reading region which corresponds to the face of the platen glass. The number of bars 20 displayed in the liquid crystal scale 19 can be increased or decreased in the direction of the arrow x in FIG. 2(a) and in FIG. 5 by the cursor operating button 23 in substantially the same manner as in the cursor position control effected in a conventional microcomputer.

A cursor position sensing device 20A is connected to the liquid crystal scale 19 (or a drive device therefor) and is enabled to detect the number of bars 20 displayed in the liquid crystal scale 19, i.e. the position of the uppermost of the bars 20 (hereinafter referred to as "cursor").

The detection can be carried out by any of the known methods using the magnitude of voltage or amperage or the count displayed in a counter, for example. The output from the cursor position sensing device 20A is connected to the input/output interface 104.

A scanner 50 is connected to the input/output interface 104 and is enabled to effect automatic scanning for the reading of a manuscript in response to the output from the interface 104.

In addition to the automatic scanning mentioned above, the scanner 50 is enabled to effect manual scanning by the use of a scanner operating button 22 connected to the input/output interface 104. By the manual scanning, the scanner 50 can be stopped at any position in the document reading device 1 which is freely elected by the operator.

A scanner position sensing device 50D is connected to the scanner 50 and enabled to detect the position of the scanner 50. The position of the scanner can be detected in terms of the magnitude of resistance or that of voltage by fastening a slider of a variable resistor to the scanner 50.

The detection of the position of the scanner can otherwise be effected by providing a rotary shaft of a scanner drive motor (not shown) with a rotary encoder or by using a pulse motor for the driving of the scanner.

The output from the scanner position sensing device 50D is connected to the input/output interface 104, similarly to the output from the cursor position sensing device 20A.

To the input/output interface 104 are further connected a read start button 6D to set the document reading device 1 reading the manuscript (automatic scanning), a position input button 24 to feed to the input/output interface 104 the position of the cursor and the position of the scanner 50 detected respectively by the cursor position sensing device 20A and the scanner position sensing device 50D, and a image sensor 13 to read the document.

Further to the input/output interface 104 can be connected the digital reproducing device 2 serving to convert the image signals processed within the microcomputer 100 into a visible image, as illustrated in FIG. 1.

FIG. 3 is a schematic perspective view illustrating the outward appearance of a digital copying machine utilizing an embodiment of this invention.

As illustrated in this diagram, the digital copying machine comprises a document reading device 1 and a digital image reproducing device 2. The document reading device 1 is mounted on the digital image reproducing device 2.

A platen glass 16 (FIG. 4) is disposed on the upper side of the document reading device 1 and a manuscript cover 5 is disposed to cover the platen glass.

On an operation panel for the document reading device 1, a power source switch 6A, a region setting key 6B which will be described afterward with reference to FIG. 6, a read start button 6D, a ten-key 6C for setting the number of copies chosen to be produced, etc. are arranged.

The manuscript display window 3 is disposed in the casing of the document reading device 1 in such a manner as to be easily observed. The optical system including the scanner 50 is configured so that a part of light reflected on the manuscript will reach the manuscript display window 3 and form an image thereon as described afterward with reference to FIG. 4.

FIG. 4 is a schematic cross section illustrating the optical system used in the embodiment of this invention. In this diagram, the same numerical symbols as found in FIG. 3 denote identical or equivalent components.

A reading line to be read out or a selected region of the manuscript 4 laid on the platen glass 16 is illuminated by the light from an exposure lamp 8. The light reflected from the manuscript 4 (image light) is reflected by a first mirror 9 and a second mirror 10 and allowed to reach a third mirror 11.

Since the third mirror 11 is translucent, a part of image light is reflected by the third mirror 11, passes through a focussing lens 12, and is brought to the image sensor 13.

The remaining image light which passes through the third mirror 11 is reflected by a fourth mirror 14 and a fifth mirror 15 and allowed to reach a Fresnel lens 7. In the document display window 3, therefore, an image of the selected region of the manuscript 4 is focussed.

Figure 6:
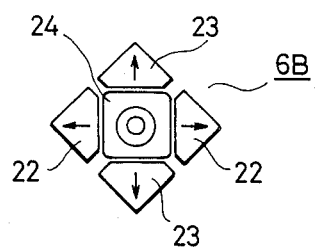
FIG. 6 is a plan view of region setting keys.

At this point, the scanner 50 can be moved to any desired position in the direction of the arrow y [the direction of sub-scanning in FIG. 2(a)] by using the scanner operating button 22 as described afterward with reference to FIG. 6. The operator, therefore, is enabled to observe a desired portion of the manuscript through the medium of the manuscript display window 3 by manual scanning of the scanner 50.

The speed of movement of the exposure lamp 8 and the first mirror 9 is twice that of the second mirror 10, the third mirror 11, and the fourth mirror 14 as widely known.

Figure 5:
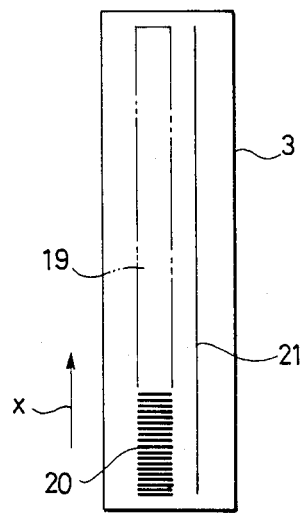
FIG. 5 is a schematic plan view of a document display window.

FIG. 5 is a schematic plan view of the manuscript display window 3. As illustrated in the diagram, a liquid crystal scale 19 and a sub-scanning direction region setting line 21 are formed in the document display window 3.

The liquid crystal scale 19 is of the bar graph type. By using the cursor operating button 23 as described afterward with reference to FIG. 6, this liquid crystal scale 19 is enabled to increase or decrease the number of bars 20 displayed as arranged parallelly in the direction of the arrow x. In other words, the position of the cursor of the liquid scale 19 can be moved in the direction of the arrow x.

FIG. 6 is a plan view of the region setting key 6B shown in FIG. 3. In this diagram, the same numerical symbols as found in FIG. 1 denote identical or equivalent components.

As illustrated in FIG. 6, the region setting key 6B is composed of a pair of scanner operating buttons 22, a pair of cursor operating buttons 23, and a position input button 24.

The scanner operating buttons 22 are a pair of switches for moving the scanner 50 to a desired position (manual scanning). By the scanner operating buttons 22, the scanner 50 can be moved in the direction of the arrow inscribed on the surface thereof—namely, in the direction of the arrow y (FIG. 2(a), FIG. 4) or the opposite direction.

The cursor operation buttons 23 are a pair of switches for moving the cursor of the liquid crystal scale 19 to a desired position. By the cursor operating buttons 23, the cursor of the liquid crystal scale 19 can be moved in the direction of the arrow inscribed on the surface thereof —namely, in the direction of the arrow X (FIG. 2(a), FIG. 5) or in the opposite direction.

The position input button 24 is used for reading into the microcomputer 100 the position of the scanner 50 and the position of the cursor of the liquid crystal scale 19.

Now, the method for setting the pertinent region of a manuscript in the embodiment of this invention will be explained below.

First, the exposure lamp 8 is turned on to illuminate the manuscript 4 on the platen glass 16 and cause the light reflected on the surface of the manuscript to be directed toward the manuscript display window 3.

Then, the scanner operating button 22 is depressed to move the scanner 50 in the direction of the arrow y. When an image of the pertinent region of the manuscript appears in the manuscript display window 3 in consequence of the movement of the scanner 50, the boundaries between the pertinent region and the rest of the region—namely $y_O$ and $(y_O + \Delta y)$ (FIG. 2(a))—are sequentially aligned with the sub-scanning direction region setting line 21 formed in the manuscript display window 3.

Figure 2B:
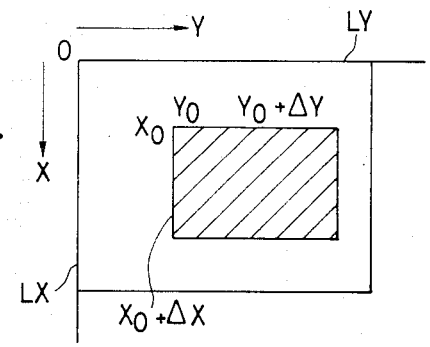

Then by the operation of the position input button 24, the numerical values of $y_O$ and $(y_O + \Delta y)$ are written in the RAM 102 to set the region in the direction of the arrow Y indicated in FIG. 2(b).

Then by the depression of the cursor operating button 23, the cursor of the liquid crystal scale 19 is moved in the direction of the arrow x. When the cursor is aligned severally with the boundaries between the pertinent region and the rest of the region—namely $x_O$ and $(x_O + \Delta x)$ (Fig. 2(a)), the position input button 24 is depressed each time the alignment is made.

By the operation just mentioned, the numerical values of $x_O$ and $(x_O + \Delta x)$ are written in the RAM 102. In this manner, the region in the direction of the arrow x indicated in FIG. 2(b)—namely $X_O$ and $(X_O + \Delta X)$ are set.

In consequence of the operation described above, the pertinent region in the RAM 102 is set so as to correspond to the pertinent region of the manuscript. Thereafter, the scanner 50 is returned to its predetermined home position and automatic scanning with the scanner 50 is started by depression of the read start button 6D (FIG. 1). Consequently, the image sensor 13 read out the image of the manuscript.

Of the output from the image sensor 13, the portion which corresponds to the region indicated by hatch lines in FIG. 2(b) and designated as described above is written in the RAM 102. Otherwise, the data covering all area of the manuscript may be tentatively stored in the RAM 102 and only the data corresponding to the aforementioned designated region may be read out of the RAM 102.

In the foregoing description, the pertinent region of the manuscript has been depicted as a rectangle whose four sides are parallel to the direction of main scanning or the direction of sub-scanning. Optionally, the pertinent region may be a polygon containing a projection or depression on condition that all the sides of the polygon are parallel to the direction of main scanning or the direction of subscanning.

Even when this invention is configurated so as to lack the document memory illustrated in FIG. 2(b), only image signals of the pertinent region of the manuscript can be fed out in their unmodified form or after being subjected to a proper processing on the real-time basis.

Now, a modification of the optical system shown in FIG. 4 will be described.

Figure 7:
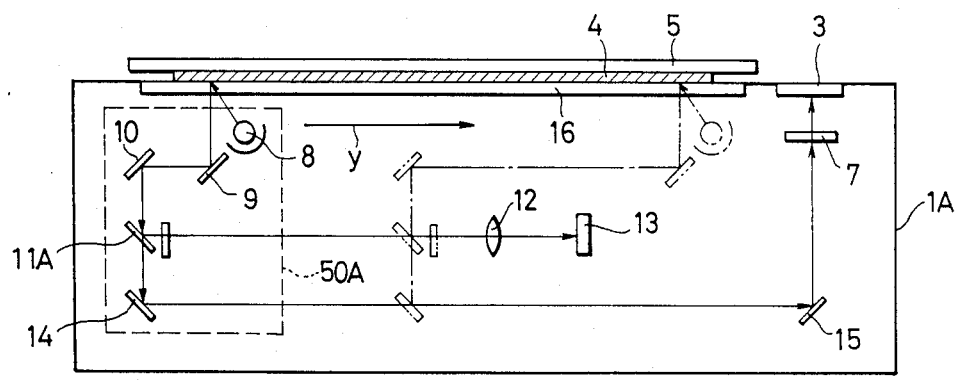
FIG. 7 is a schematic cross section illustrating a first modification of the optical system suitable for the present invention.

FIG. 7 is a schematic cross section for illustrating a first modification of the optical system suitable for the present invention. In this diagram, the same numerical symbols as found in FIG. 4 denote identical or equivalent components.

A third mirror 11A furnished for a scanner 50A of a document reading device 1A illustrated in FIG. 7 is a reflecting mirror as compared with the third mirror 11 in the document reading device 1 of FIG. 4 which is a translucent mirror.

The aforementioned third mirror 11A is so adapted that it will thrust itself into the path of the image light reflected from the second mirror 10 or retract from the path as occasion demands.

To be specific, during the setting of the pertinent region of the manuscript, the third mirror 11A is retracted from the aforementioned light path as indicated by the dotted line to enable the image light to be wholly directed toward the Fresnel lens 7. After the setting of the pertinent region and during the subsequent automatic scanning with the scanner 50A, the third mirror 11A is thrust into the aforementioned light path as indicated by the solid line to permit the image light to be wholly directed toward the image sensor 13.

As the result, either during the setting of the pertinent region of the manuscript or during automatic scanning with the scanner 50A, the image light, namely the light reflected from the manuscript 4 can be wholly directed toward the Fresnel lens 7 or the image sensor 13.

In the document reading device 1 illustrated in FIG. 4, the image light reflected from the second mirror 10 can be directed by means of the third mirror (translucent mirror) 11 simultaneously toward the Fresnel lens 7 and the image sensor 13. Thus, the intensity of the image light reaching the Fresnel lens 7 and the image sensor 13 is roughly one-half of that of the image light impinging upon the third mirror 11. Thus, the exposure lamp 8 is required to have about twice intensity of light.

As is plain from the foregoing description, the exposure lamp 8 used in the modification of FIG. 7 has only about half intensity of light required for the exposure lamp 8 of the aforementioned embodiment. The modification, therefore, permits a cut in the electric power consumed by the document reading device and a cut in the cost of maintenance.

Figure 8:
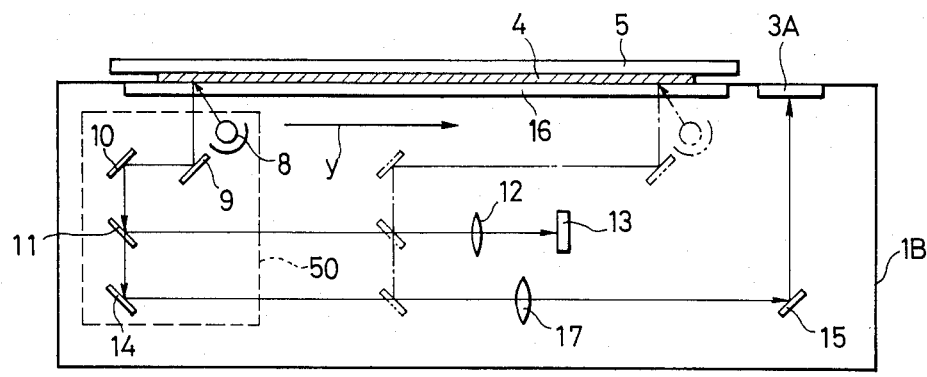
FIG. 8 is a schematic cross section illustrating a second modification of the optical system suitable for the present invention.

FIG. 8 is a schematic cross section for illustrating a second modification of the optical system suitable for the present invention. In this diagram, the same numerical symbols as found in FIG. 4 denote identical or equivalent components.

The document reading device 1B illustrated in FIG. 8, as clearly noted from comparison with the counterpart in FIG. 4, has a lens 17 interposed between the fourth mirror 14 and the fifth mirror 15 in the place of the Fresnel lens 7. The manuscript display window 3A is formed of a translucent material such as ground glass or a light diffusing plate.

Figure 9:
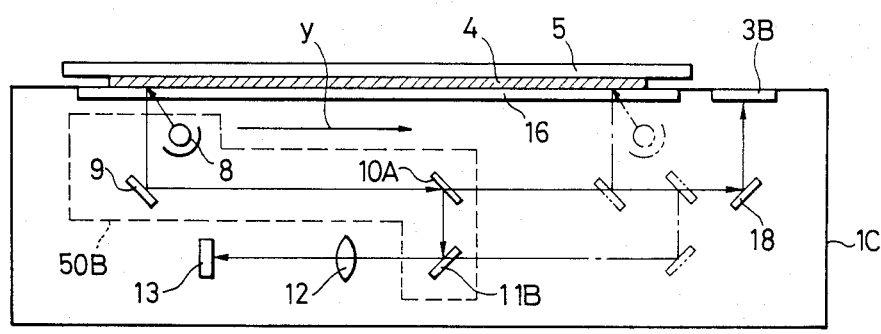
FIG. 9 is a schematic cross section illustrating a third modification of the optical system suitable for the present invention.

FIG. 9 is a schematic cross section for illustrating a third modification of the optical system suitable for the present invention. In the diagram, the same numerical symbols as found in FIG. 4 denote identical or equivalent components.

In FIG. 9, the manuscript 4 placed on the platen glass 16 of the document reading device 1C is illuminated by the light from the exposure lamp 8.

The light (image light) reflected from the manuscript 4 is reflected by the first mirror 9 and allowed to reach the second mirror 10A. Since the second mirror 10A is a translucent mirror, a part of image light is reflected by the second mirror 10A and the third mirror 11B, passes through the focussing lens 12, and reaches to the image sensor 13. The remaining part of the image light passing through the second mirror 10A is reflected by the fourth mirror 18 and allowed to reach the manuscript diaplay window 3B.

The scanner 50B is capable of scanning in the direction of the arrow y. In this case, the speed of movement of the exposure lamp 8 and the first mirror 9 is twice that of the second mirror 10A and the third mirror 11B.

In the optical system illustrated in FIG. 9, when the scanner 50B is scanning, the length of the light path from the surface of the manuscript to the manuscript display window 3B is varied while that of the light path from the surface of the manuscript to the image sensor 13 remains unchanged. As the result, the size of the image of the manuscript appearing in the display window is varied.

The setting of the pertinent region in the direction of main scanning with reference to the image appearing in the manuscript display window 3B, therefore, must be carried out at the estimated position of the scanner 50B. At the same time, the operator has to keep his eye within a plane which includes the image of the boundary of the pertinent region of the manuscript in the main scanning direction formed in the display window 3B and is perpendicular to the surface of the display window. The operator is also required to control the number of bars 20 or the position of the cursor while keeping his eye in the position described above.

In accordance with the arrangement illustrated in FIG. 9, the number of reflecting mirrors can be decreased and the construction of the document reading device 1C can be simplified despite the inconvenience suffered during the setting of the region. Particularly since the number of reflecting mirrors arranged in the direction of height is decreased, the overall dimensions of the document reader can be reduced in the direction of height to permit compaction of equipment.

The present invention described above may be embodied as modified as follows.

(1) The manuscript display window has been depicted as having a liquid crystal scale formed therein. In place of the liquid crystal scale, some other scale such as a LED array may be formed in the display window on condition that the substitute scale is provided with a cursor capable of being moved in a direction parallel to the sub-scanning direction region setting line.

(2) In the foregoing description, the image sensor 13 has been depicted to be an image sensor of the kind of CCD which forms the image in a reduced size. In place of this size-reducing image sensor, an image sensor of the intimate-contact type capable of reading the manuscript in an equal size, i.e. at a rate of 1:1, can be used. In this case, it proves convenient to use Selfok(self-focussing) lenses as a lens for focussing the reflected light from the manuscript on the image sensor.

When the image sensor of the intimate-contact type is adopted, the length of the light path from the manuscript to the image sensor must be decreased as much as possible. Even in this case, a part of reflected light from the manuscript can be directed toward the manuscript display window 3 as by interposing a translucent mirror between the platen glass and the Selfok lenses.

(3) The foregoing description has portrayed application of the present invention to the fixed platen type document reading device. This invention can be applied similarly effectively to the moving platen type or manuscript feed and read type document reader as already pointed out.

When this invention is applied to the moving platen type document reader, for example the scanner 50 illustrated in FIG. 1 is required to be substituted with means for moving the platen glass, the scanner position sensing device 50D to be substituted with a platen glass position sensing device, and the scanner operating button 22 to be substituted with a platen glass moving button respectively.

When this invention is applied to the manuscript feed and read type document reader, the scanner 50 in FIG. 1 is required to be substituted with means for conveying the manuscript, the scanner position sensing device 50D to be substituted with a device for detecting the position of the manuscript or the amount of conveyance of the manuscript, and the scanner operating button 22 to be substituted with a manuscript transfer control button respectively.

(4) The present invention has been portrayed as possessing means for setting the pertinent region in the direction of main scanning and in the direction of sub-scanning. Instead of the means just described, the present invention is only required to be provided with means capable of setting the pertinent region at least in the direction of main scanning or the direction of subscanning.

As is clear from the foregoing description, the present invention enables the required setting of the pertinent region of the manuscript to be carried out by moving the portion of the manuscript to be read out and the cursor of the liquid crystal scale formed in the manuscript display window while keeping the manuscript placed on the platen glass or inserted in the manuscript slot of the document reader, with the face of the manuscript kept under the visual observation of the operator. Thus, this invention permits the setting of the pertinent region of the manuscript to be effected very simply and accurately.

What is claimed is:

1. A document reader for reading out information of picture elements in a pertinent region of a manuscript laid on a platen glass by main scanning and sub-scanning and converting said information into electric signals, which document reader comprises light-source means for illuminating at least a reading area of said manuscript, a multiplicity of photoelectric conversion elements on which an image of said reading area of said manuscript is focussed, means for moving said reading area of said manuscript in the direction of sub-scanning, a manuscript display window disposed at such a position in said document reader as to be observed from outside and provided with a reference mark for designating said pertinent region, optical means adapted to direct a reflected light from said reading area of said manuscript toward said manuscript display window and display the image of said reading area of said manuscript in said manuscript display window, and coordinates detecting means for reading out and memorizing coordinates on said manuscript whenever a boundary of said pertinent region of the image of manuscript displayed in said manuscript display window coincide with said reference mark.

2. A document reader according to claim 1, wherein said reading area of said manuscript includes at least one scanning line in a direction of main scanning.

3. A document reader according to claim 1, wherein the boundary of said pertinent region is an outline in a direction of main scanning.

4. A document reader according to claim 1, wherein the boundary of said pertinent region is an outline in a direction of sub-scanning.

5. A document reader according to claim 1, wherein the boundaries of said pertinent region are outlines in a directions of main scanning and sub-scanning.

6. A document reader according to claim 3, wherein said reference mark for setting a pertinent region of said manuscript comprises a scale formed on said manuscript display window in such a manner that a cursor of said scale is capable of being moved in a direction parallel to the main-scanning direction of the image of said reading area formed in said manuscript display window, a cursor operating button for freely controlling movement of said cursor, and main scanning direction coordinates sensing means for detecting coordinates of a position of said cursor, with an origin of the coordinates fixed at a reference end of said scale corresponding to a reference line on the platen glass, so as to correspond to a distance from said reference line to the boundaries of said pertinent region in the direction of main scanning.

7. A document reader according to claim 4, wherein said means for detecting the coordinates of said pertinent region of said manuscript in the direction of sub-scanning comprises a sub-scanning direction region setting line formed in said manuscript display window parallelly to the direction of main scanning of the image of said reading area focussed in said manuscript display window, an operating button for freely controlling the movement of said reading area on said manuscript in the direction of sub-scanning, and sub-scanning direction coordinates sensing means for detecting coordinates of said reading area of said manuscript, with an origin of the coordinates fixed at a reference line on the platen glass, so as to correspond to a distance from said reference line to the boundaries of said pertinent region in the direction of sub-scanning.

8. A document reader according to claim 6, wherein said scale is a liquid crystal scale adapted to display emission lines of substantially equal length disposed parallelly to one another.

9. A document reader according to claim 6, wherein said cursor operating button comprises a pair of push-button switches for moving said cursor in mutually opposite directions.

10. A document reader according to claim 7, wherein said sub-scanning operating button comprises a pair of push-button switches for shifting the reading area of said manuscript in mutually opposite directions.

11. A document reader according to claim 1, wherein the image signals of said manuscript read out by said photoelectric conversion elements are stored in a memory and said memory is such that a memory region thereof is set by coordinates detected by means for sensing the coordinates of said pertinent region of said manuscript.

* * * * *